(12) United States Patent
Berke et al.

(10) Patent No.: US 9,659,008 B2
(45) Date of Patent: May 23, 2017

(54) INFORMATION-SHARING SYSTEM

(71) Applicant: Shout to Me, LLC, San Diego, CA (US)

(72) Inventors: Jonathan Berke, San Diego, CA (US); Tracy Rojas, San Diego, CA (US); William Greco, Rancho Palos Verdes, CA (US); John Coulter, Northfield, IL (US)

(73) Assignee: Shout to Me, LLC, San Diego, CA (US)

( * ) Notice: Subject to any disclaimer, the term of this patent is extended or adjusted under 35 U.S.C. 154(b) by 0 days.

(21) Appl. No.: 15/222,100

(22) Filed: Jul. 28, 2016

(65) Prior Publication Data
US 2016/0335253 A1    Nov. 17, 2016

Related U.S. Application Data

(62) Division of application No. 14/586,631, filed on Dec. 30, 2014, now Pat. No. 9,406,294.

(60) Provisional application No. 62/058,497, filed on Oct. 1, 2014.

(51) Int. Cl.
| | | |
|---|---|---|
| *G06F 17/28* | (2006.01) | |
| *G10L 15/18* | (2013.01) | |
| *G10L 15/22* | (2006.01) | |
| *H04L 29/06* | (2006.01) | |
| *G06F 17/30* | (2006.01) | |
| *H04W 4/02* | (2009.01) | |

(52) U.S. Cl.
CPC ........ *G06F 17/28* (2013.01); *G06F 17/30719* (2013.01); *G10L 15/18* (2013.01); *G10L 15/1807* (2013.01); *G10L 15/22* (2013.01); *H04L 65/60* (2013.01); *H04W 4/021* (2013.01); *G10L 2015/223* (2013.01)

(58) Field of Classification Search
USPC ........................ 704/2, 9, 200, 251, 269–278
See application file for complete search history.

(56) References Cited

U.S. PATENT DOCUMENTS

| | | | | |
|---|---|---|---|---|
| 7,868,912 B2 * | 1/2011 | Venetianer | ........ | G06F 17/30799 348/143 |
| 8,599,013 B1 * | 12/2013 | Baron, Sr. | ............. | H04W 4/021 340/539.1 |
| 2014/0368601 A1 * | 12/2014 | deCharms | ............. | H04W 4/021 348/14.02 |

* cited by examiner

*Primary Examiner* — Marcellus Augustin
(74) *Attorney, Agent, or Firm* — Donald R. Boys; Central Coast Patent Agency, Inc.

(57) ABSTRACT

An information gathering system has a server connected to a network, the server having a processor and a coupled data repository, with software executing on the processor from a non-transitory medium providing system intelligence, and a plurality of computerized communication devices coupled to the network, each having a microphone, a speaker, a GPS capability reporting geographic location, and a display screen, each computerized communication device executing coded instructions providing local intelligence at least presenting interactive interfaces to users of the devices, the users enabled to record an audio or audio-video input to the server. The server receives a report of an event occurring at or near a specific geographic location, determines computerized communication devices reporting geographic location within a predetermined distance from the specific geographic location, and messages users of the second computerized communication devices, eliciting input regarding the event.

10 Claims, 16 Drawing Sheets

INFORMATION-SHARING SYSTEM

CROSS-REFERENCE TO RELATED DOCUMENTS

The present patent application is a Divisional application from co-pending U.S. Ser. No. 14/586,631, filed Dec. 13, 2014, which issues as U.S. Pat. No. 9,406,294 on Aug. 2, 2016, which claims priority to provisional application 62/058,497, filed on Oct. 1, 2014, entitled, "Geo-Sensitive Communications System for Mobile Travelers". Disclosure of the priority applications is incorporated herein in its entirety by reference.

BACKGROUND OF THE INVENTION

1. Field of the Invention

The present invention is in the field of communications and pertains particularly to methods and apparatus for recording, processing and using inputs from users.

2. Discussion of the State of the Art

In the field of communications, particularly mobile communications, information services have been developed that provide information about traffic, road conditions, location of local businesses and the like to requesting users operating from mobile communications appliances. Some of these services provide downloadable software applications that may be installed on communications devices to enable access and use of the services over a local wireless network.

Although users may access information by the apparatus and method described above, they typically must navigate to the application on their device, execute the application, and periodically refresh the information. Drivers must typically look at the screen to gather information and touch the screen to interact with it, both of which are unsafe while driving. Thus much manual intervention is required by the user in order to access and continue to receive the requested information while traveling.

More recently information and entertainment service companies have integrated communications and information-receiving components into automobiles. Examples include systems such as On-Star™ and Sirius XM™ and other Mobile Internet radio devices or mobile information terminals having integration to the automobile's electrical system, and in some cases the automobile's computer or engine control module (ECM). These mobile, in-dash information terminals are typically dedicated to a particular service and are adapted for one-on-one interaction between the service and the user of the service. Voice activation allows the user to operate these types of systems in a hands-free manner.

A problem with the information systems described above is that each subject and related information that is available to the user is separate from other subjects for which the system might provide information. For example, if a user's car breaks down, the user might ask the system for help. The system may respond by alerting third party services to respond to the request in a dedicated fashion. During that time no information is available regarding other subjects. The user must direct the system using voice for each service type available through the interface. Although in some cases similar information, such as real-time traffic density information and mapping information may be received together using one application and one request, the user would not get any other data that may not be related to the purpose of the user's request made through the application or terminal interface.

Therefore, what is clearly needed is a mobile communications system that provides information to the user from other users and integrated alert/reporting services and allows the user to submit real time information for use by the system to inform others.

BRIEF SUMMARY OF THE INVENTION

In one embodiment of the invention an information gathering system is provided, comprising a server connected to a network, the server having a processor and a coupled data repository, with software executing on the processor from a non-transitory medium providing system intelligence, and a plurality of computerized communication devices coupled to the network, each having a microphone, a speaker, a GPS capability reporting geographic location, and a display screen, each computerized communication device executing coded instructions providing local intelligence at least presenting interactive interfaces to users of the devices, the users enabled to record an audio or audio-video input to the server. The server receives a report of an event occurring at or near a specific geographic location, determines computerized communication devices reporting geographic location within a predetermined distance from the specific geographic location, and messages users of the second computerized communication devices, eliciting input regarding the event.

In one embodiment the messages sent by the server to the second communication devices refer to information in the report received. Also in one embodiment the report received is a report from a first one of the computerized communication devices reporting an event occurring in the immediate observable proximity of the first one of the computerized communication devices. Also in one embodiment the input provided by the computerized communication devices is recorded in the data repository, and is processed by a natural language machine intelligence to create a summary of the event first reported.

In one embodiment of the system the reports are further processed using natural language machine intelligence to determine a channel according to pre-programmed channel definitions, and the reports are tagged accordingly. Also in one embodiment a profile is maintained for each user of the system, the profile is updated periodically recording user ID, device ID associated with the user, user preferences, and user selected associations with other users, and wherein reports received by the system are periodically transmitted to other users by cross-referencing report characteristics and content with user location, location-based information and user preferences. And in one embodiment the summaries are transmitted to subscribing enterprises.

In another aspect of the invention an information-sharing method is provided, comprising receiving, at a server connected to a network, the server having a processor and a coupled data repository, with software executing on the processor from a non-transitory medium providing system intelligence, a report of an event occurring at or near a specific geographic location, determining, by the software executing on the processor, among a plurality of computerized communication devices coupled to the network, each having a microphone, a speaker, a GPS capability reporting geographic location, and a display screen, each computerized communication device executing coded instructions providing local intelligence at least presenting interactive interfaces to users of the devices, the users enabled to record an audio or audio-video input to the server, individual ones of the computerized communication devices currently located within a preprogrammed distance from the event occurring at or near the specific location, and messaging users of the second computerized communication devices, eliciting input regarding the event.

In one embodiment of the method the messages sent by the server to the second communication devices refer to information in the report received. Also in one embodiment the report received is a report from a first one of the computerized communication devices reporting an event occurring in the immediate observable proximity of the first one of the computerized communication devices. Also in one embodiment the input provided by the computerized communication devices is recorded in the data repository, and is processed by a natural language machine intelligence to create a summary of the event first reported.

In one embodiment the reports are further processed using natural language machine intelligence to determine a channel according to pre-programmed channel definitions, and the reports are tagged accordingly. In one embodiment a profile is maintained for each user, the profile is updated periodically recording user ID, device ID associated with the user, user preferences, and user selected associations with other users, and wherein reports received by the system are periodically transmitted to other users by cross-referencing report characteristics and content with user location, location-based information and user preferences. And in one the summaries are transmitted to subscribing enterprises.

DETAILED DESCRIPTION OF THE INVENTION

In various embodiments described in enabling detail herein, the inventors provide a mobile communications system that provides users with an ability to record in the system observations concerning events and conditions in their own immediate vicinity, and to receive postings recorded by other users, the received postings potentially useful for immediate action and near-future planning of activities. The present invention is described using the following examples, which may describe more than one relevant embodiment falling within the scope of the invention.

Figure 1:
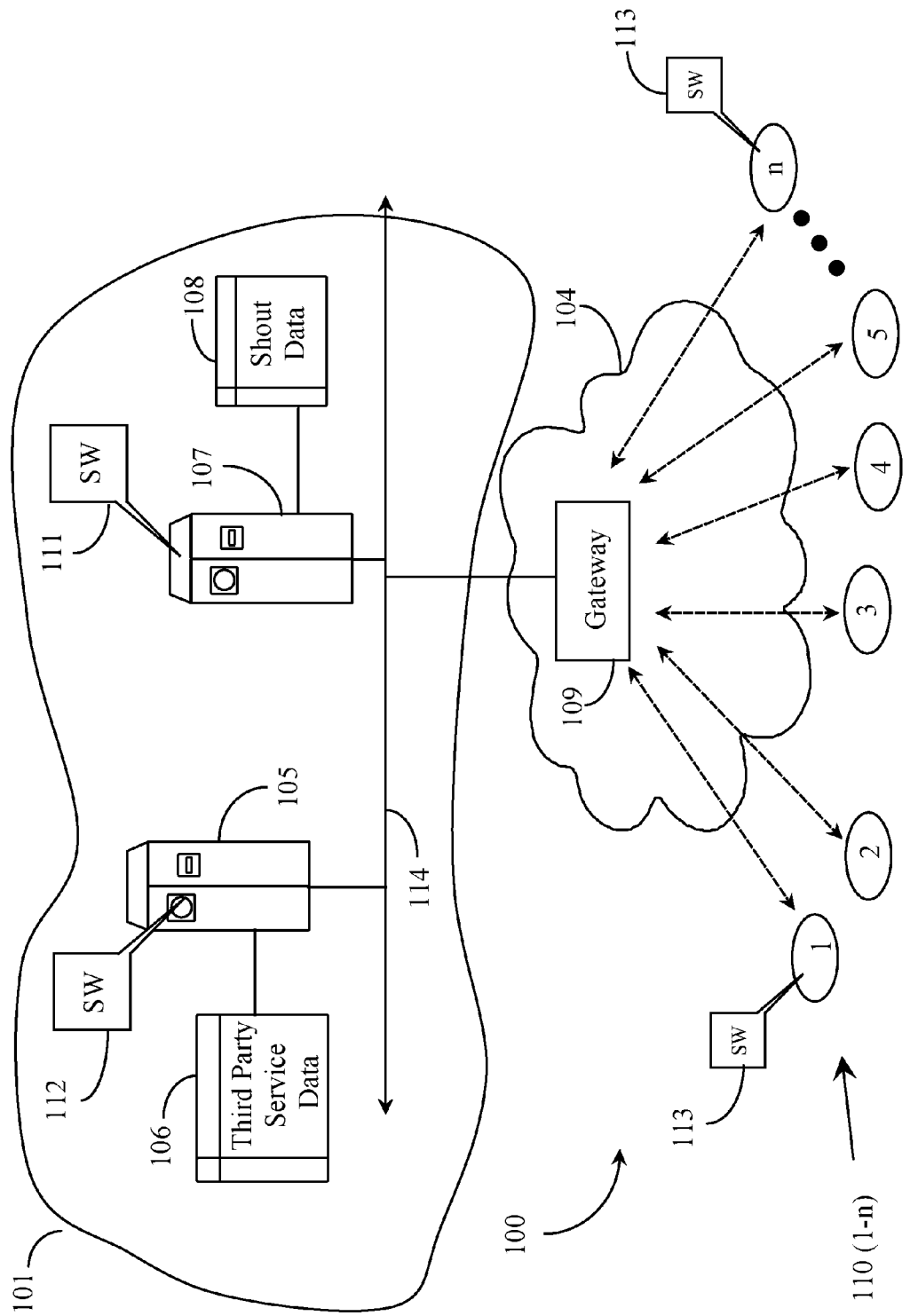
FIG. 1 is an architectural overview of a mobile communications network according to an embodiment of the present invention.

FIG. 1 is an architectural overview of a mobile communications network 100 according to an embodiment of the present invention. Network 100 includes a wireless communications carrier network 104, which may be a digital cellular network, a wireless fidelity network (WiFi), or another wireless network capable of carrying voice and message data in communications and capable of facilitating user access to the Internet network.

In the example of FIG. 1 Internet backbone 114 represents all of the lines, equipment, and access points that make up the well-known Internet network 101 as a whole, including connected sub-networks. Therefore, there are no geographic limitations to the practice of the invention accept where intentionally implemented.

In this example users are depicted as users 110 (1-n), each of which is physically enabled for communication by a mobile appliance such as a cellular telephone, a pad device or portable computer device. Mobile users 110 (1-n) may in many embodiments be mobile in the sense that they are traveling, such as in vehicles on a highway or road. Use cases where users interact through mobile devices in a vehicle such as an automobile or a truck are a large part of the use of the system of the invention, but by no means all. Users may in many cases be stationary in a home or a business, or may be walking. The invention in some embodiments is also not limited to un-tethered communications devices, but may be connected through vehicle-integrated appliances such as an Internet-connected radio or a formerly dedicated service terminal such as On-Star™ unit.

Each user 110 (1-n) in this example has a mobile communications appliance or device that is or may be registered to the system in order to practice the present invention. The devices carried by the users 110 (1-n) operate in interaction with the system by virtue of application software (SW) 113 executing in the user's devices. In many examples following the users are described as interacting while driving a vehicle, but again it is to be remembered that the system is not limited to such use. In the example of FIG. 1 the mobile appliances connect via a cellular network 104 through a gateway 109 to Internet backbone 114.

It may be assumed that the SW 113 operable on each client device is specific to the make, model and operating system of the device. SW 113 is a client to software 111 executing on a server 107 in Internet 101, which server is hosted by an enterprise providing system services according to embodiments of the present invention. Server 107 in this example is a network-connected server operated by a first-party service provider through which the service is available to users and co-branded client's representing partners. Server 107 includes a processor, a data repository, and SW 111 executing from a non-transitory medium on the processor. SW 111 provides evaluation and moderation for input from users 110 (1-n).

In various embodiments of the invention SW 113 enables users 101(1-n) to create and post recorded voice input to the system operating through server 107. These postings from users are termed "Shouts" by the inventors. Users are enabled and encouraged to observe situations, activities, accidents, events, and other environmental information, and to create verbal or visual Shouts that are recorded and posted to the system. These Shouts are stored in a data repository 108 and are processed in a variety of ways by the system executing portions of SW 111, and may be provided to other users that may be deemed to be benefited by the information recorded in a Shout. A very simple example is that one mobile user may notice an accident on a roadway and may create and post a Shout regarding the accident. The system may process this Shout and provide it in either original form, or a processed form to other users who may be determined to be, for example traveling along a roadway toward that accident, and their experience may therefore be affected by the accident that is the subject of the original Shout. In some cases the system may create Shouts that may be distributed to users, the information perhaps gleaned from other sources than original Shouts from other users. The system may, for example, track traffic reports provided by such as certain radio stations, and may create and push Shouts to registered users that may be affected by the traffic conditions tracked. The system may also elicit Shouts from registered users, as the system deems such users to be in a position to provide needed information.

Server 105 in FIG. 1 represents a third-party service provider or partner or affiliate of the primary service provider operating through server 107. A third-party service provider may be a traffic reporting entity, a road-condition reporting service, a news organization, or any other entity that might provide information to and or receive information from mobile users. Server 105 includes a processor, a data repository and SW 112 executing from a non-transitory medium on the processor. SW 112 may be a result of a software development kit (SDK) acquired from the primary service provider for the purpose of developing a Shout application that is unique to the business of the particular third-party service provider. Affiliates might receive an application program interface (API) for interfacing with the primary service and having integration of the Shout service to their model of service, but still be required to access the primary service for functionality. All APIs in one embodiment are compatible with JavaScript Object Notation (JSON). However this is not to be construed as a limitation of practice as there are other alternatives (Object Notation Language) that are available.

SW 112 may include all of the functionality of SW 111. Likewise, client SW 113 may also be acquired from a partner or affiliate of the main service provider. In one embodiment SW 111 retains status as the processing entity and partner SW 112 may include all functions except for processing Shouts. In another embodiment, SW 112 may be fully independent from SW 111 and may include all available functions. The mix of functionality for SW 112 will depend at least in part on the nature of the third-party service and any agreement and affiliation with the primary service provider.

In embodiments of the invention, at any particular point in time, registered and active users may be tracked as to geographic location. Most applicable mobile devices registered to the service will have GPS enabled, and in some cases, where the device is used in a moving vehicle, the vehicle may have an on-board computerized system with GPS capability. Users may be tracked as well by content of Shouts. For example, a user who reports, in a Shout, an accident at a certain intersection in a certain city may be assumed to be at or near that intersection, and location information for the active user may be updated accordingly. Speed and direction and pre-determined route information may also be used with location information to update position for active users.

Entering the System

SW Application 113 (App 113) executable on communication devices carried by users is an application that may be acquired in different ways. In some cases, manufacturers may provide App 113 in devices at point-of-sale. In most cases users may download and install an App 113 from a source such as Apple or Verizon, for example, selecting an App that is compatible with the make and model and operating system of the user's device. In some cases, the App, once installed, may be operable any time the user's device is powered on. In some cases, the user may boot the App. only when engaged in activity where the user may want to employ the App.

Figure 2A:
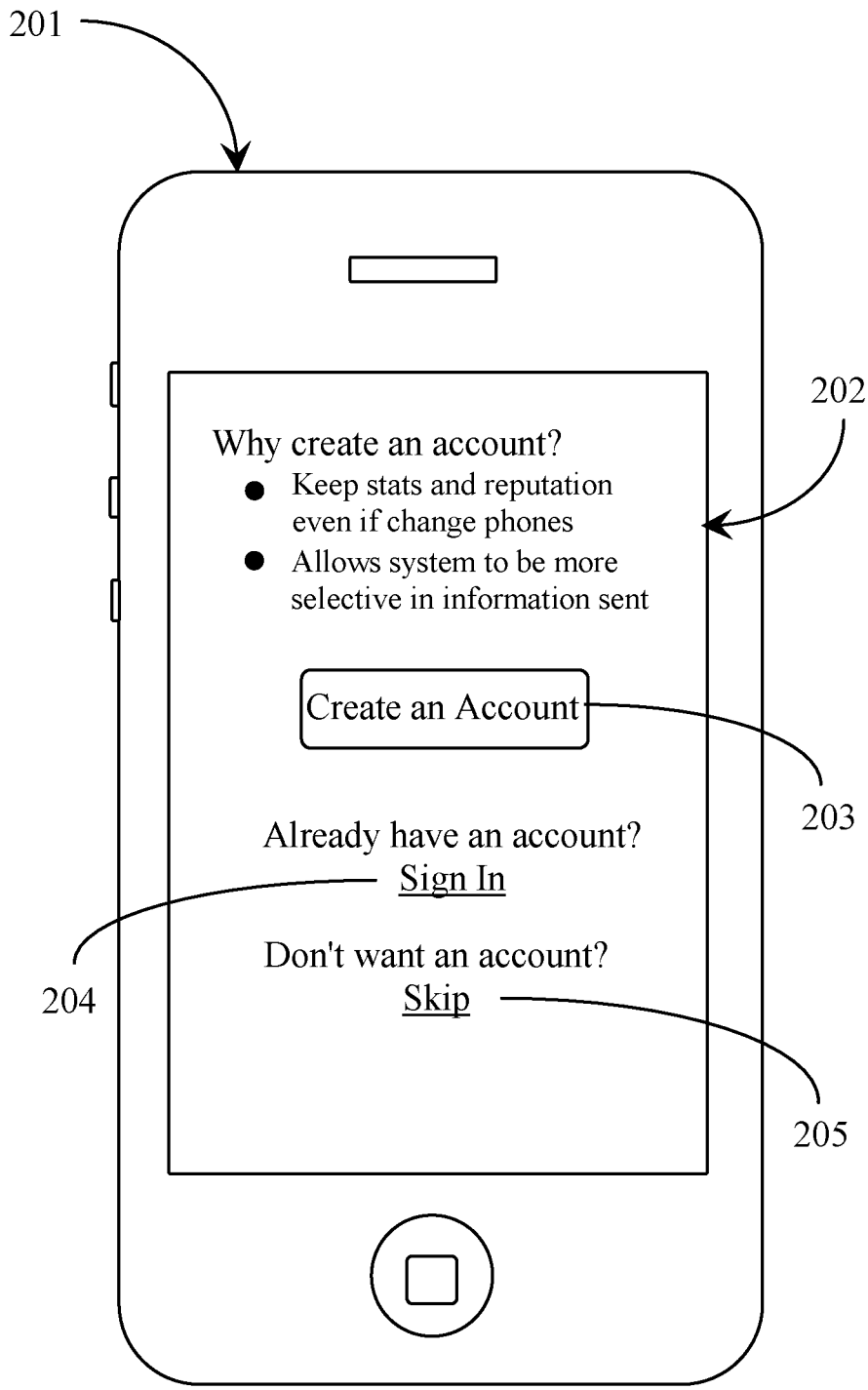
FIG. 2a is an elevation view of a mobile device in an embodiment of the invention.

FIG. 2*a* is an elevation view of a mobile device 201 having a touch screen 202 in an embodiment of the invention. Screen 202 is an overlay screen that is displayed when a user launches App 113. This screen is provided for users to sign in, sign up or skip the sign-in/sign-up process. An informational display at the top of the screen informs the user as to why having an account with the system is a good idea. An interactive button 203, if initiated by the user, launches a process for creating an account. If the user already has an account, the user may select link 204 to sign in. If the user elects to skip the process, the user may select link 205.

Figure 2B:
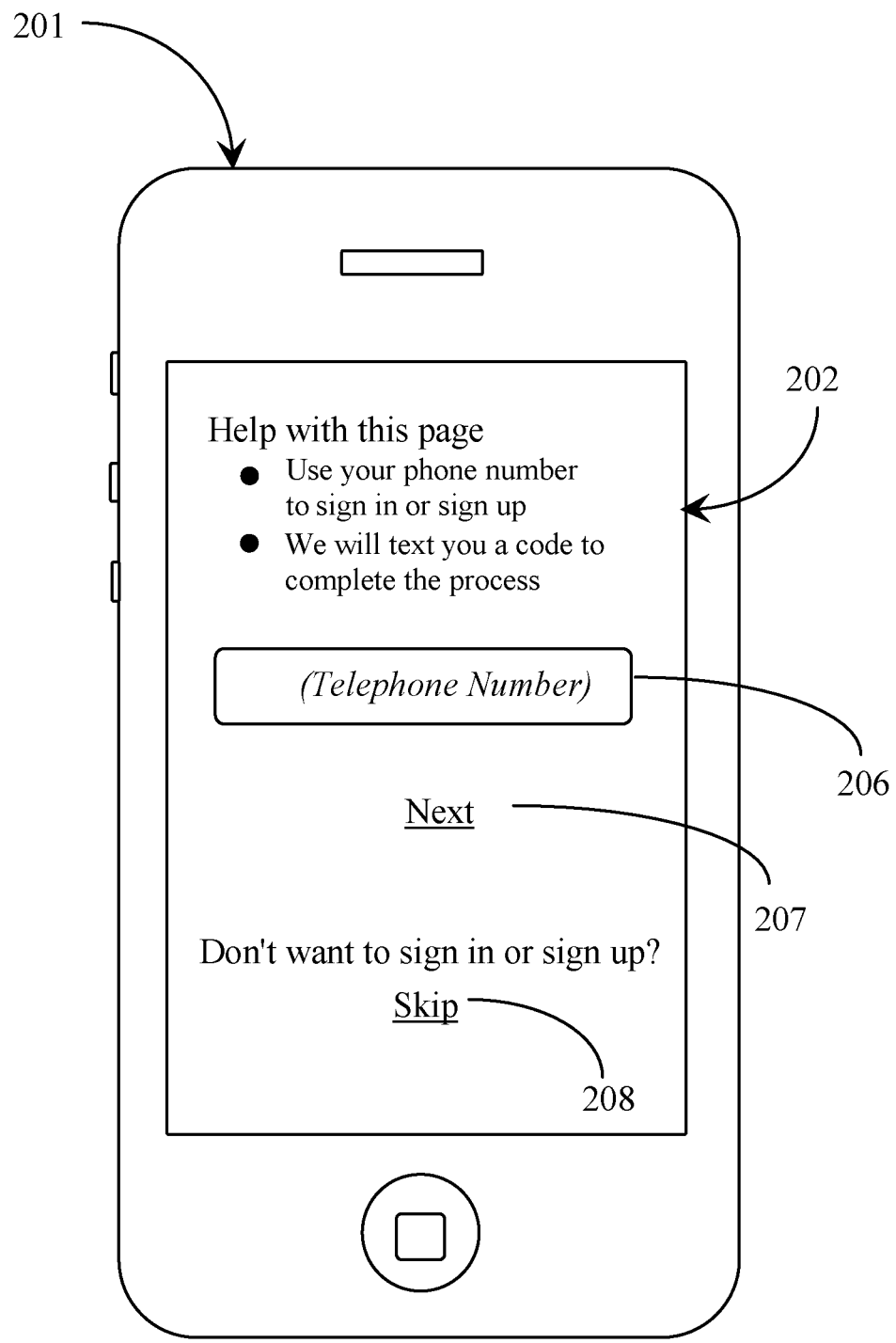
FIG. 2b is an elevation view of the mobile device of FIG. 2a with a different display.

FIG. 2*b* is an elevation view of device 201 in one embodiment with an overlay screen displayed if the user elects to sign in or sign up. Again, instructional information is displayed at the top of the screen. The user is instructed to enter the phone number for the connected device in field 206. Once the phone number is entered, the user is expected to initiate the "Next" link 207. If the user elects to skip the process, that user may initiate link 208.

Figure 2C:
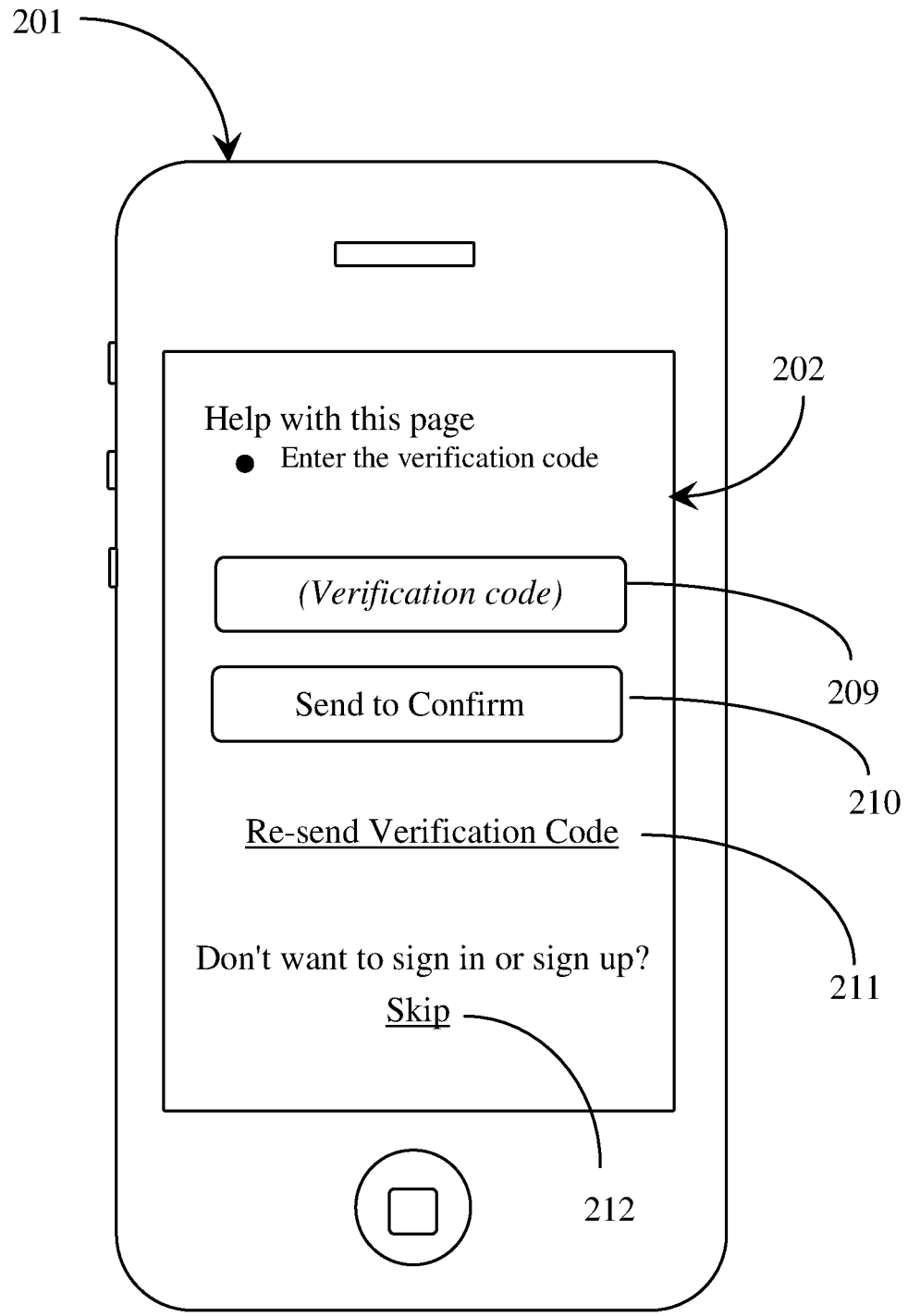
FIG. 2c is an elevation view of another display in sign in-sign up process.

If the user enters the telephone number and selects "Next", the system texts a verification code to the device for which the telephone number is registered. The user may access the text messaging facility for the device to see the verification code. FIG. 2*c* is a screen presented in one embodiment as a result of the user entering the phone number in the screen of FIG. 2*b* and selecting "next". At the top of the page the user is instructed to enter the verification code, which may be done in field 209. The user sends the code back to the system by selecting "Send to Confirm" at 210. If there is an error the user may select for the system to resend the verification code at 211. The "skip" option is still displayed to the user at 212.

Figure 2D:
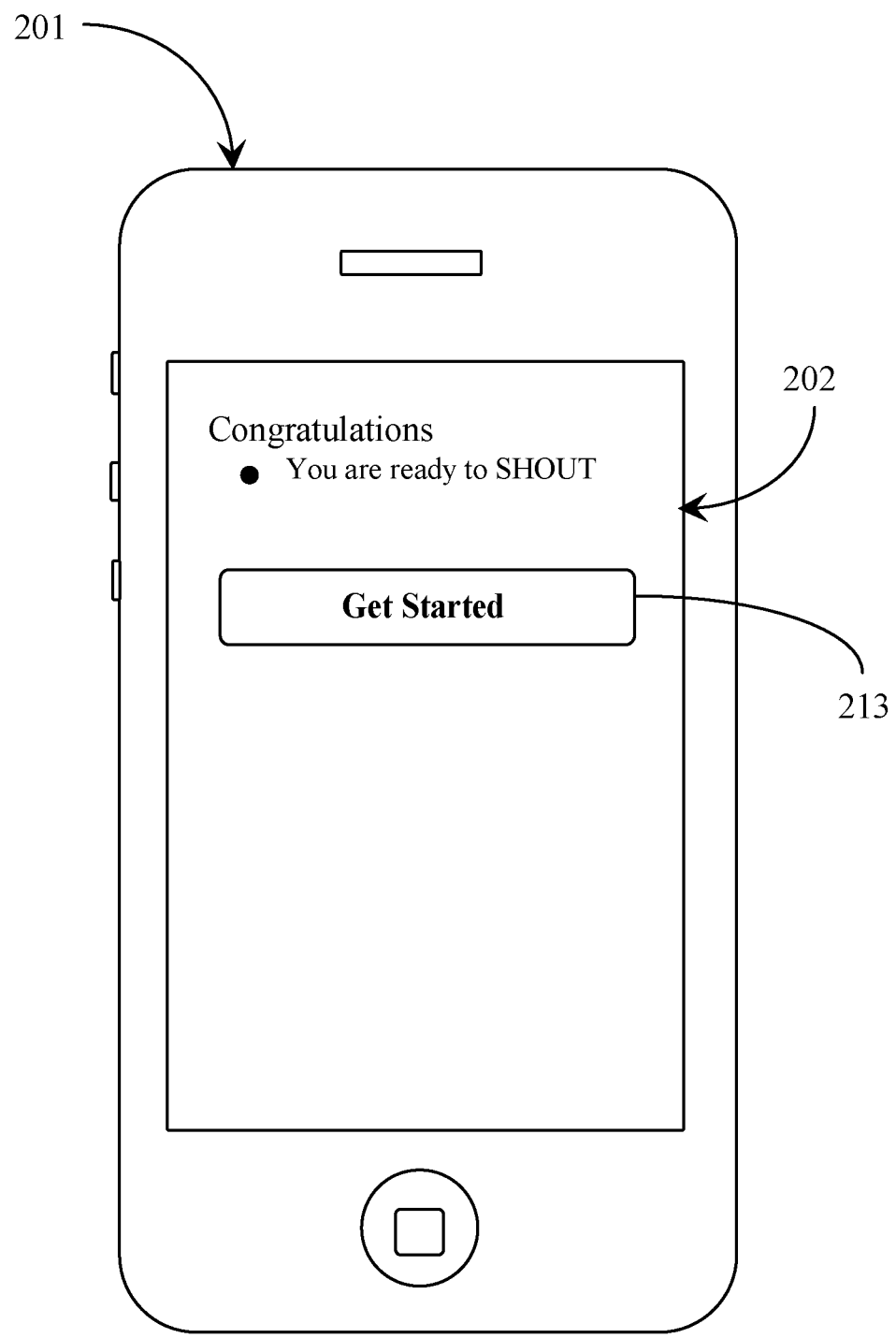
FIG. 2d is an elevation view of another display in sign in-sign up process.

At the server, once the verification code is sent, copied and returned, the system checks to see that the verification code returned is the code sent. FIG. 2*d* is a screen displayed to the user in one embodiment if the process is confirmed successfully. The user is informed that the process was successful, and the system is ready for the user to participate. Button 213 may be selected to begin execution of the functions of the mobile Shout application 113.

Figure 2E:
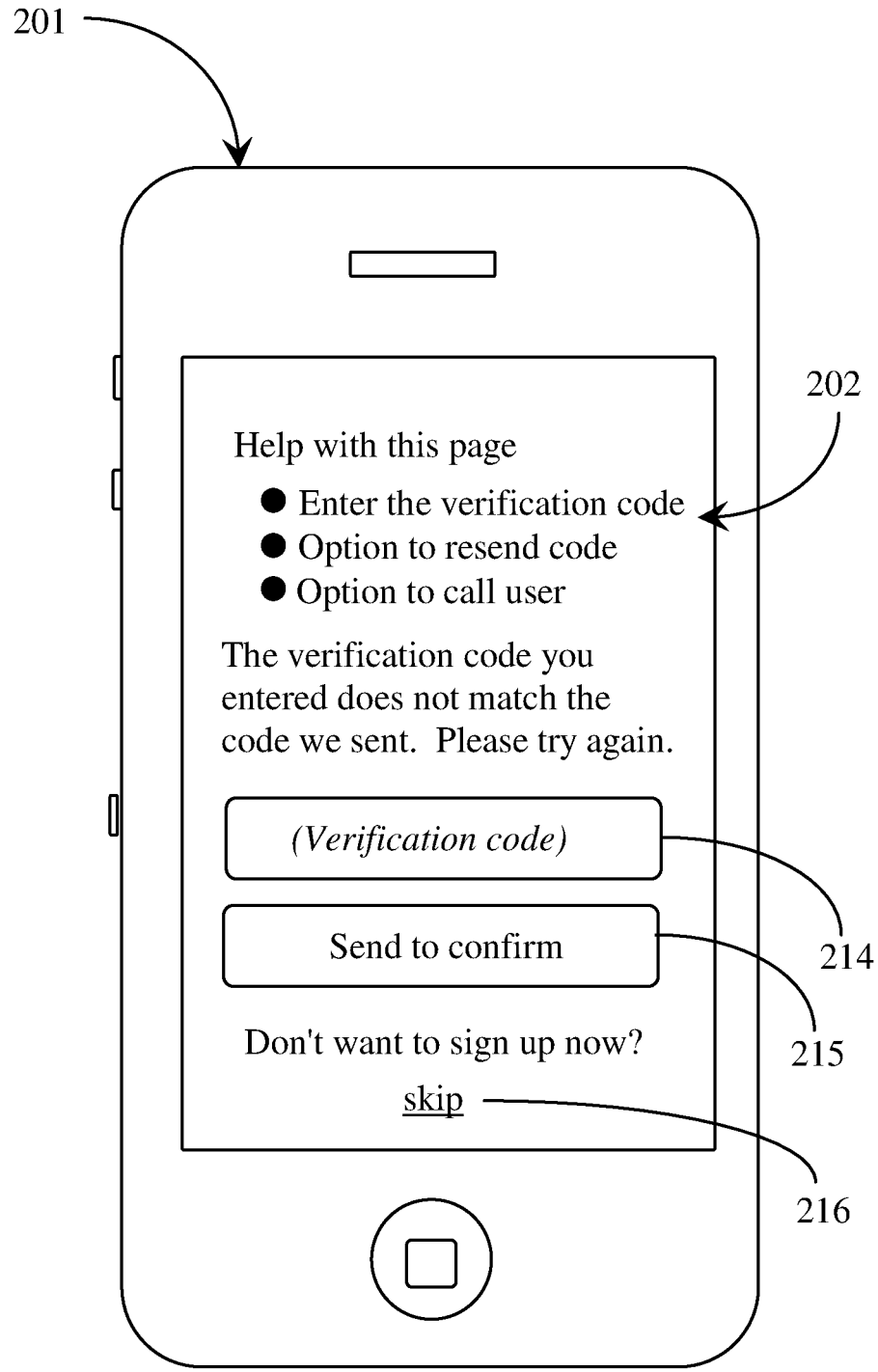
FIG. 2e shows an overlay screen presented if the user enters an invalid verification code.

FIG. 2*e* shows an overlay presented in one embodiment if the user enters an invalid verification code. Again the user is provided with instruction at the top of the display, and in this case, informed that the verification code entered did not match the code sent. The user is asked to try again, and may enter the code in field 214 and send it by button 215. The option to skip is still presented with button 216.

Figure 3:
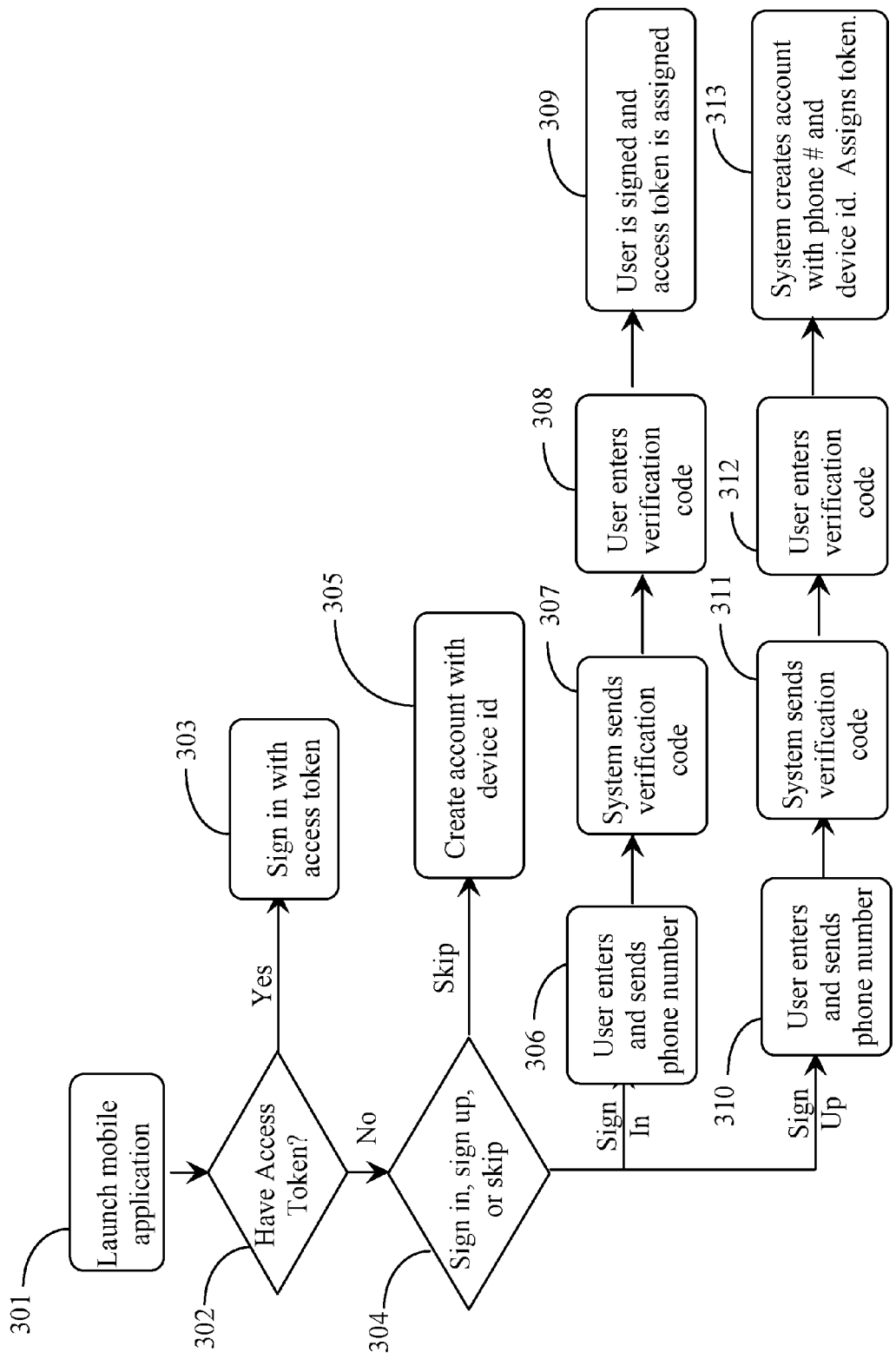
FIG. 3 is a flow diagram following the sign-in/sign-up process.

FIG. 3 is a flow diagram illustrating the sign-in/sign-up process so far described. At step 301 the user launches the mobile application 301, which the user has accessed and installed at some prior point. Launching the mobile application opens a communication channel between the mobile device and server 107. Every device has an accessible device id, which may vary according to manufacture and model, but the system is enabled to recognize the id regardless.

If the particular user has used the application before, and is a registered user, that user may have a token stored that was assigned by the system when the user registered. The system determines at step 302 if there is such a token, and if the token is found, the user is signed in automatically at step 303 and may begin using the system through functions of the mobile application in communication with server 107 (FIG. 1).

If the system determines at step 302 that there is no access token, control goes to step 304, and the user is requested to sign in, sign up or skip. This is done through the interactive displays in the screen described above. If the user selects "skip" in any screen where this option is available, an account is created at step 305 using just the device id. The process ends at that point for that user.

If the user elects in the screen of FIG. 2a to sign up (Create an account), control goes to step 310. The user is prompted to enter the device phone number (FIG. 2b) and to send that to the system. At step 311 the system texts a verification code to the user, and the user is prompted to enter and send back the code at step 312 (FIG. 2c). If the code is the same as sent, the system creates an account for that user at step 313. If the code sent back is not the code sent, the user is prompted to try again (FIG. 2e).

If the user selects button 204 in the interactive screen depicted in FIG. 2a to sign in (the user already has an account) control goes to step 306. The user is prompted to enter and send the phone number, and the system sends a verification code at step 307. The user enters and sends the verification code at step 308, and the user is signed in by the system at step 309 if the verification code matches the code sent.

Creating and Sending a Shout

Once the user is signed in or signed up, and is past the registration or sign-in process, that user may make use of the system. Broadly speaking, with the mobile device on and operable with a microphone and speaker, and with application 113 executing, the system enables users to record information as relatively brief verbal observations or statements, or optionally video, termed Shouts, that are recorded and sent to server 107, where the Shouts may be stored in repository 108, and may be used in a variety of ways. A focus of the invention is that the Shouts provided by some users may be useful for other users, and may therefore be sent to the users to whom the Shouts may be vital. As a simple example, one user, with device and application active, may be traveling along a highway and notice a piece of furniture in the roadway, which that user has to swerve to avoid. The user may create a Shout regarding this road hazard. The system, by virtue of GPS coordinates and also by input of the user in the Shout, may send the Shout after processing to other users, in particular to users who may be in the vicinity and perhaps approaching the particular location. Another user, passing the location and having received the Shout, may create a Shout that the obstruction is now removed, and the system may update by sending then new Shout to users who may be affected.

In some cases, Shouts may be sent as a broadcast, in other instances selectively, and Shouts may be sent not only to other users who may be active at the time, but also to users who are not traveling, but are known by the system to use that particular roadway. The Shout may also be sent to emergency services or to law enforcement and the like, depending on prior arrangement and configuration, and on the nature of information in a Shout.

Once a user is in operation with the device and the application running, screens are displayed and processes enabled to aid and prompt the user, and the nature of the interactive screen is associated with an operating mode of the system. For example, operation can roughly be divided into user input modes, and system output modes. Users are enabled to command the system to enable certain functions, like listening for a command, recording a Shout, receiving and reviewing statistics from the system, looking at past recorded Shouts, and so on. An important issue is that most functions are voice-enabled, so the user can avoid attending to the screen too a great extent. This is accomplished in one embodiment by a natural language interface that processes audio input and listens for command phrases, as well as recording voice input when in a Shout recording mode.

Figure 4:
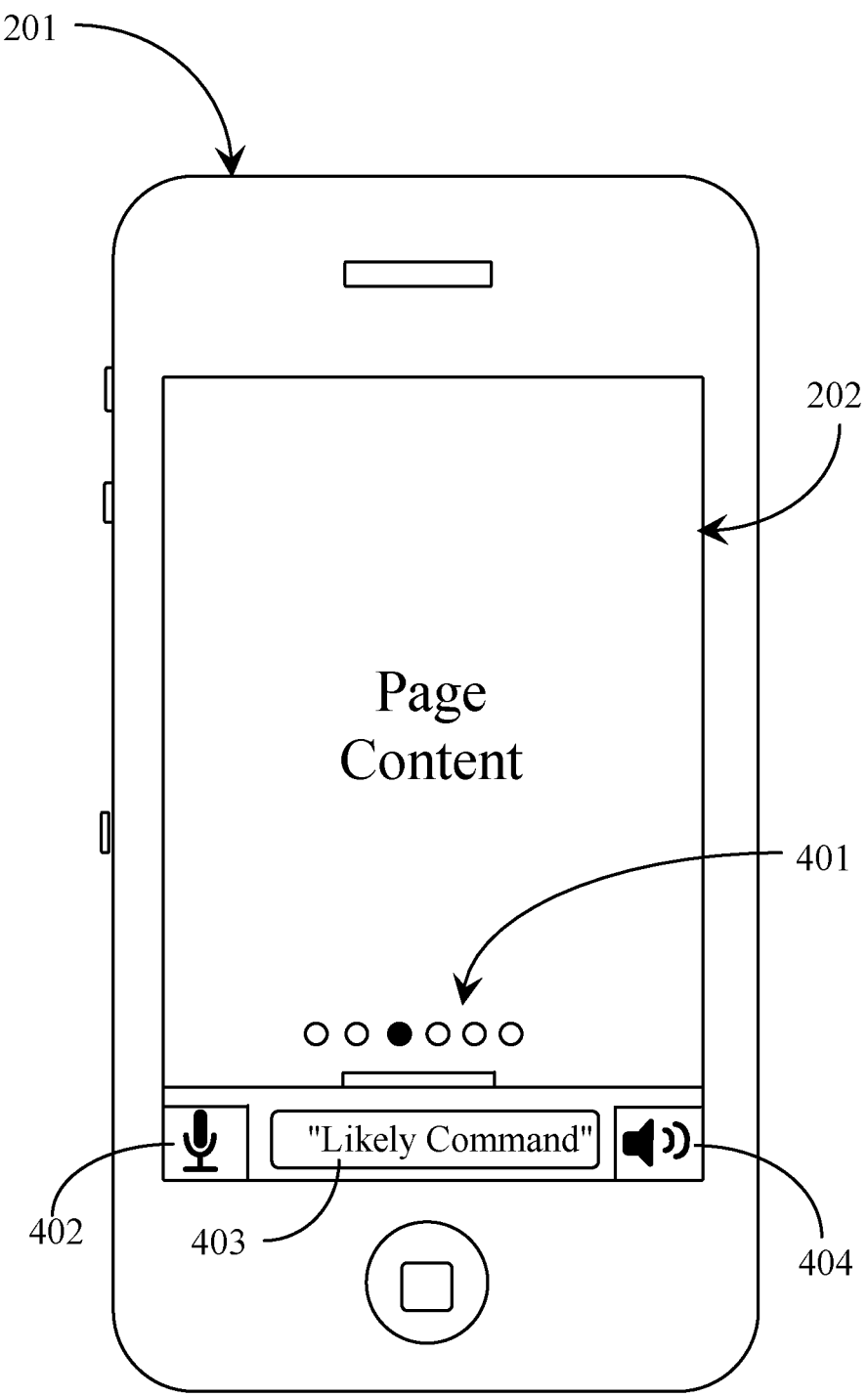
FIG. 4 illustrates an interactive screen in an exemplary mode to describe general screen content.

Most interactive screens presented to a user beyond the sign-in process have an interactive link depicted as a microphone, and another depicted as a speaker. FIG. 4 illustrates an interactive screen in an exemplary mode. Depending on the page currently selected, the page content is displayed in the upper part of the screen. A content indicator bar 401 changes according to the content page displayed. One of the dot indicators is shown filed-in, depending on the content page and mode at the moment.

Depending on the current mode, there will be a most likely next mode. A button 403 indicates the likely command to send the system to the next most likely mode. That action may take place by a user touching the button in a touch-sensitive interactive display, or by speaking the command. A microphone button 402 is displayed for the user to select to put the system into "listening" mode, in which mode the natural language abilities of the system are activated and enabled. While in listening mode the microphone icon may be animated. A speaker button 404 is provided to put the system in audio output mode, for playing a Shout from the system, or for playing other information provided by the system, such as previously recorded Shouts by the same user.

Figure 5:
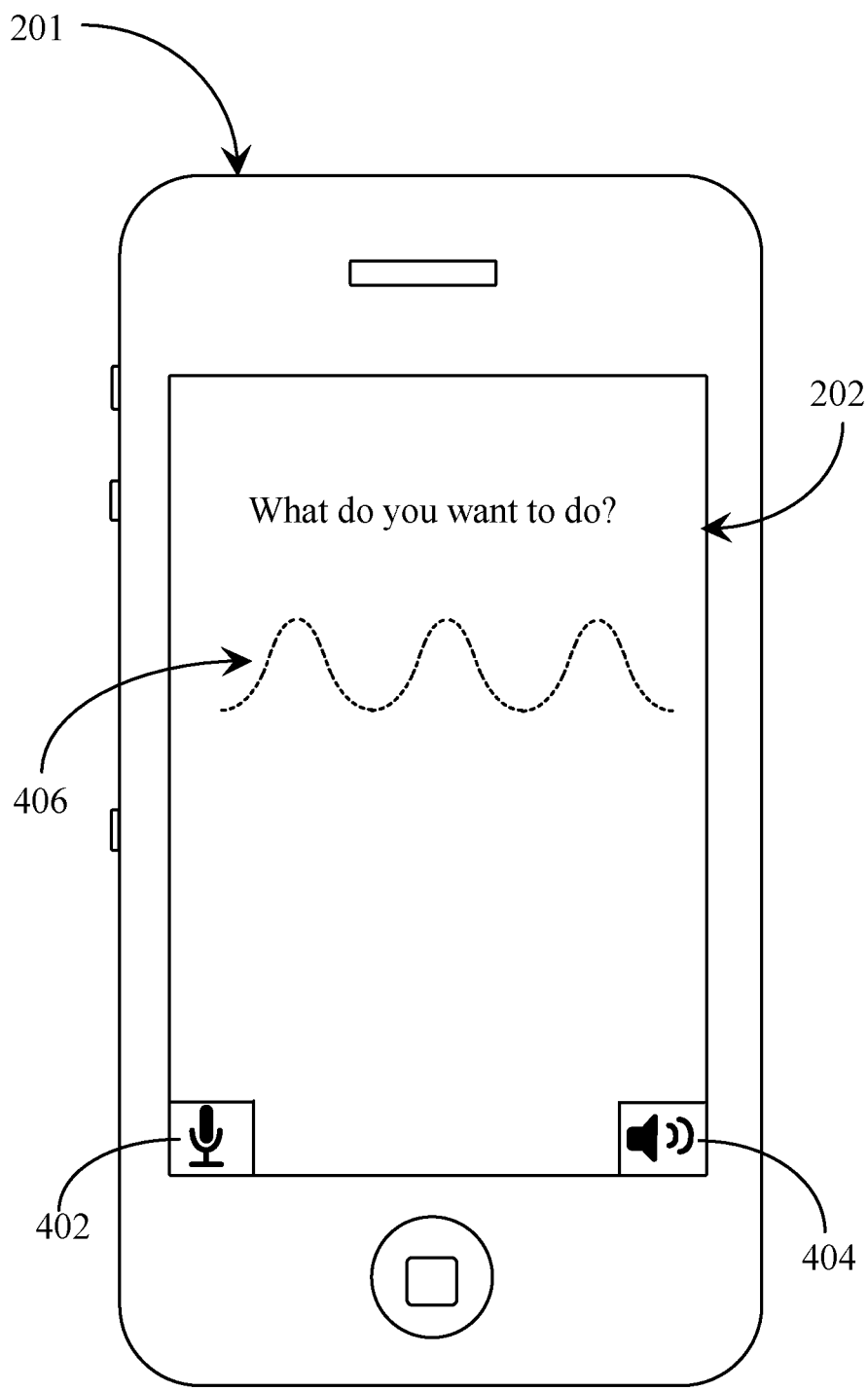
FIG. 5 illustrates an interactive display with the system in listening mode.

FIG. 5 illustrates an interactive display with the system in listening mode enabled typically by the user touching the microphone interactive icon. In listening mode the user is queried as to intent, and a waveform 406 is displayed. The query is helpful, because users are enabled to command the system in listening mode as well as to record Shouts. The microphone icon will typically be animated. Touching the microphone icon again removes the system from the listening mode.

Figure 6:
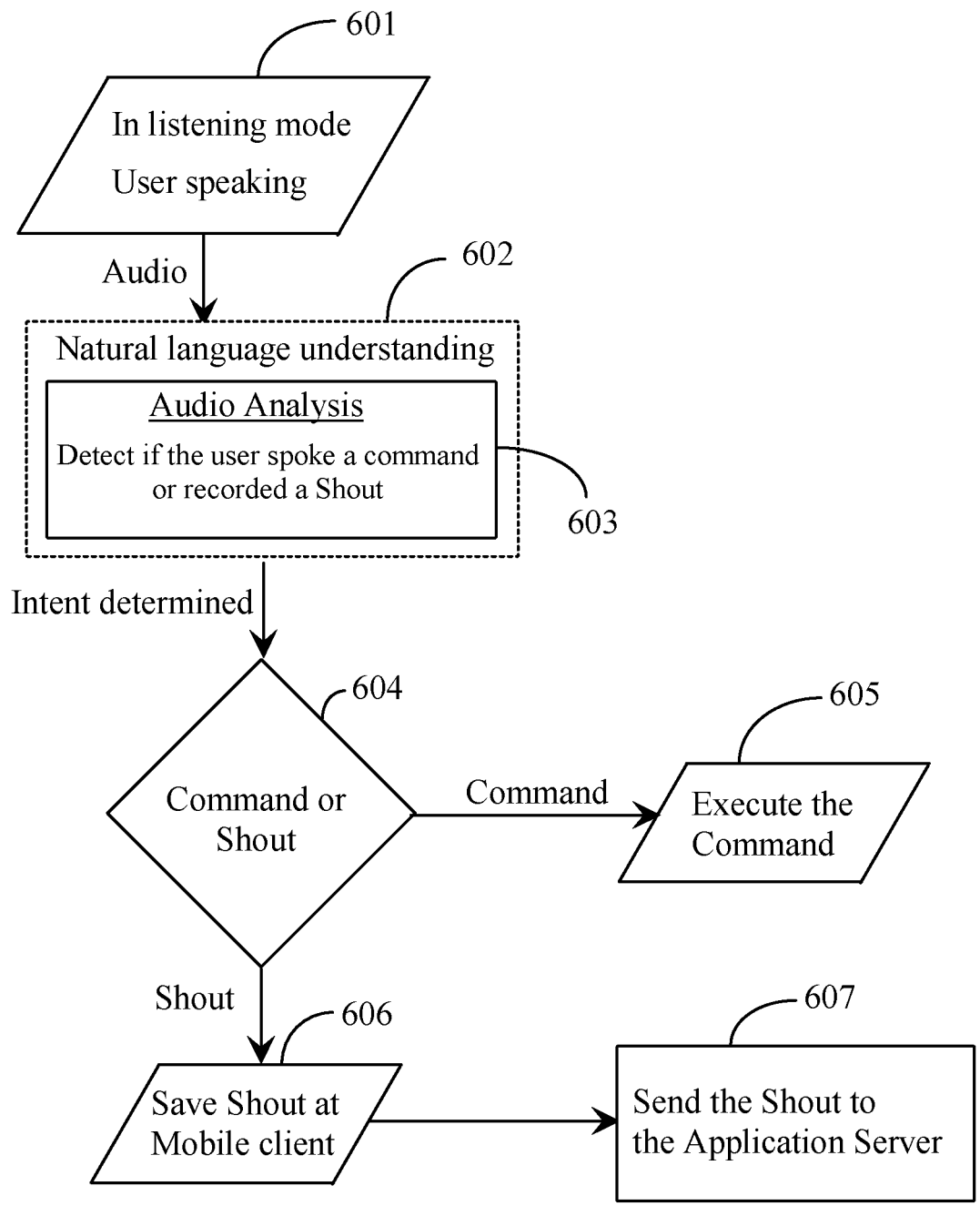
FIG. 6 is a flow diagram illustrating interaction with the system in listening mode.

FIG. 6 is a flow diagram illustrating interaction with the system in listening mode. At step 601, with the system in listening mode, the user speaks. The enunciation may be a command, or it may be a Shout. The audio is monitored by the system at step 602 incorporating Natural Language speech recognition software executing in the mobile device in one embodiment. In an alternative embodiment the execution may be at the server. The Natural language system is enabled to recognize specific intention of the speaker, and if one such is recognized, the command is executed at step 605. One such command is a stated command to record a Shout, and if recognized, the system in executing the command will stay in listening mode, but recognize that the next enunciation over a period of time is to be taken as a Shout, and may change the instruction in the interface of FIG. 5 to "Record your Shout". Still, the user may neglect to command the system to record a Shout, and may speak a Shout anyway. This is not an impediment, because the system is enabled to recognize a Shout as opposed to a command in any case and treat it as such at Step 606.

Figure 7:
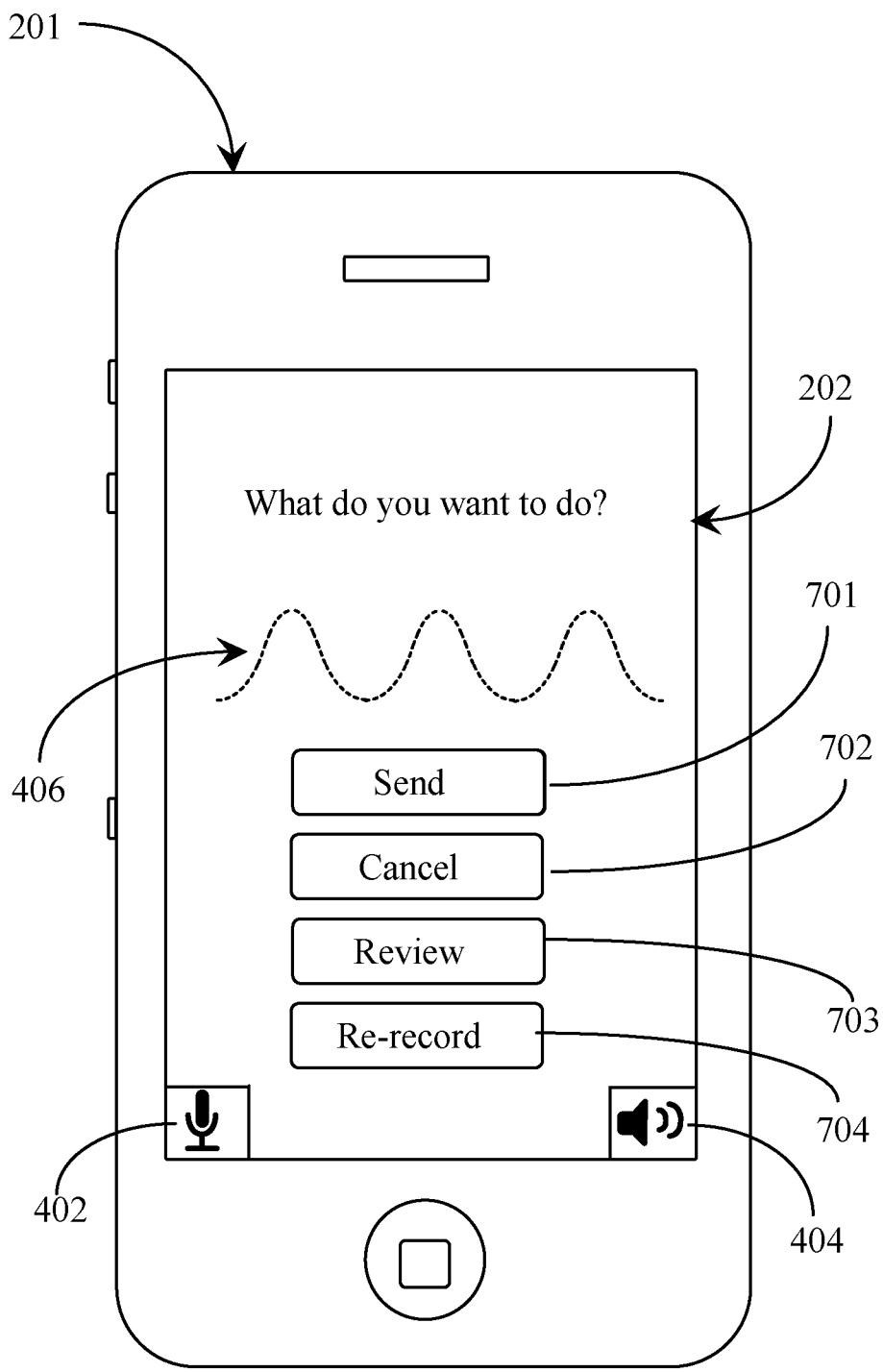
FIG. 7 illustrates an interactive interface presented to the user after a Shout is recorded at the client.

Once a Shout is saved at the mobile client the system looks for the intent of the user regarding the Shout. FIG. 7 illustrates an interactive interface presented to the user after the Shout is recorded at the client. In this interactive screen the user is given four options: Send at button 701, Cancel at button 702, Review at button 703 and Re-record at button 704. The user may speak the intent which will be interpreted by the natural language system. If the user selects Send, the recorded Shout is transmitted to server 107 and stored in repository 108 (see step 607 in FIG. 6. Further processing takes place at the server as described in enabling detail further below. If the user selects Cancel in the screen of FIG. 7, the Shout is canceled. The Shout may be deleted at the client, but may in some instances be saved, at least for a period of time, allowing the user to reconsider.

Figure 8:
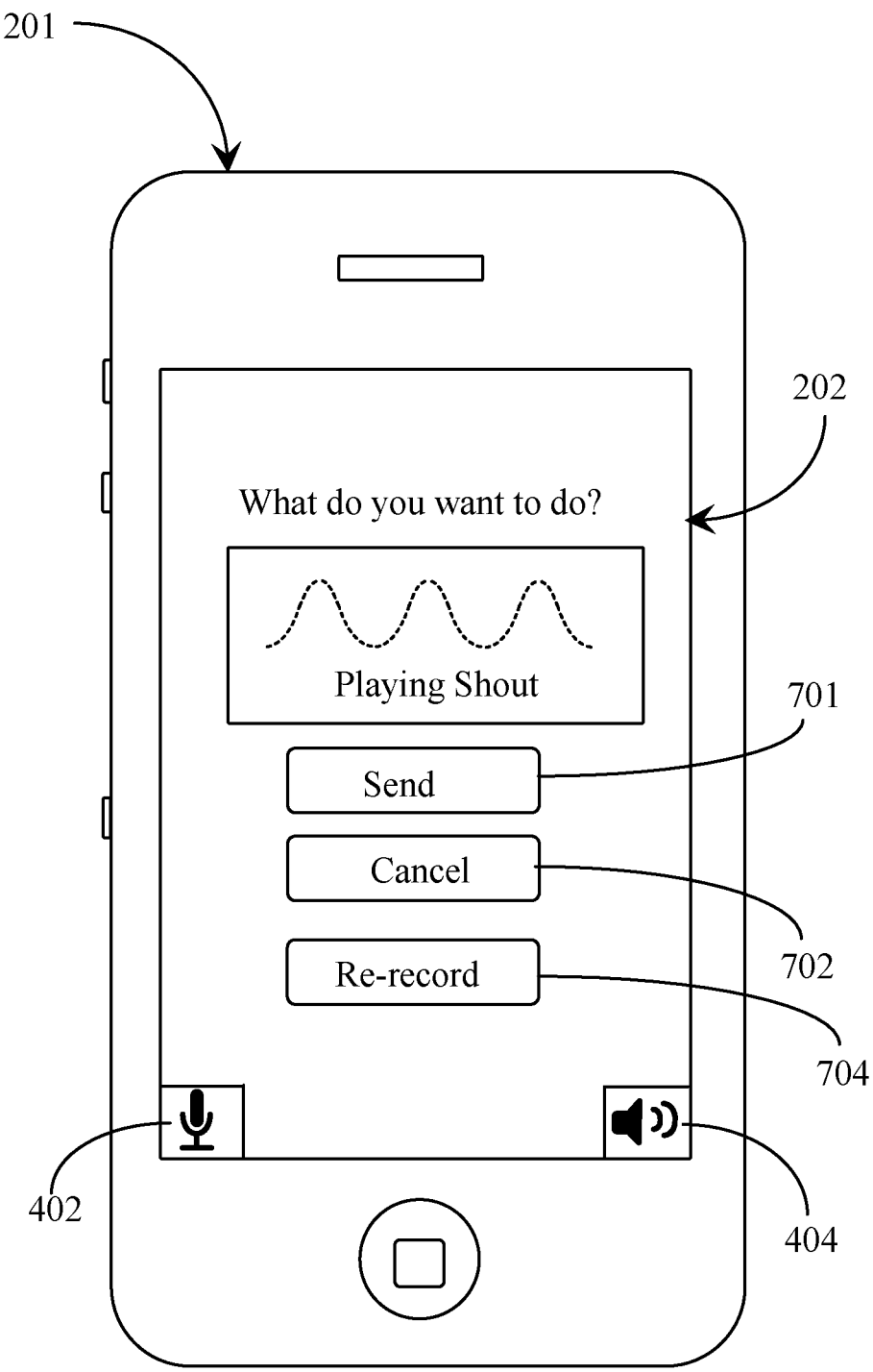
FIG. 8 illustrates a screen displayed as a Shout is played back to a user in Review.

If the user selects Review, the screen changes as shown in FIG. 8, and the Shout is played back to the user over the device speaker. In one embodiment, while the Shout is being played, other links on the screen are dimmed and inactive. When the Shout playback finishes, the links again become active, and the user may select to send the Shout to the server, Cancel the Shout or Re-Record, which also cancels the Shout, but puts the mode back to listening specifically for a Shout.

Processing a Shout

Figure 9:
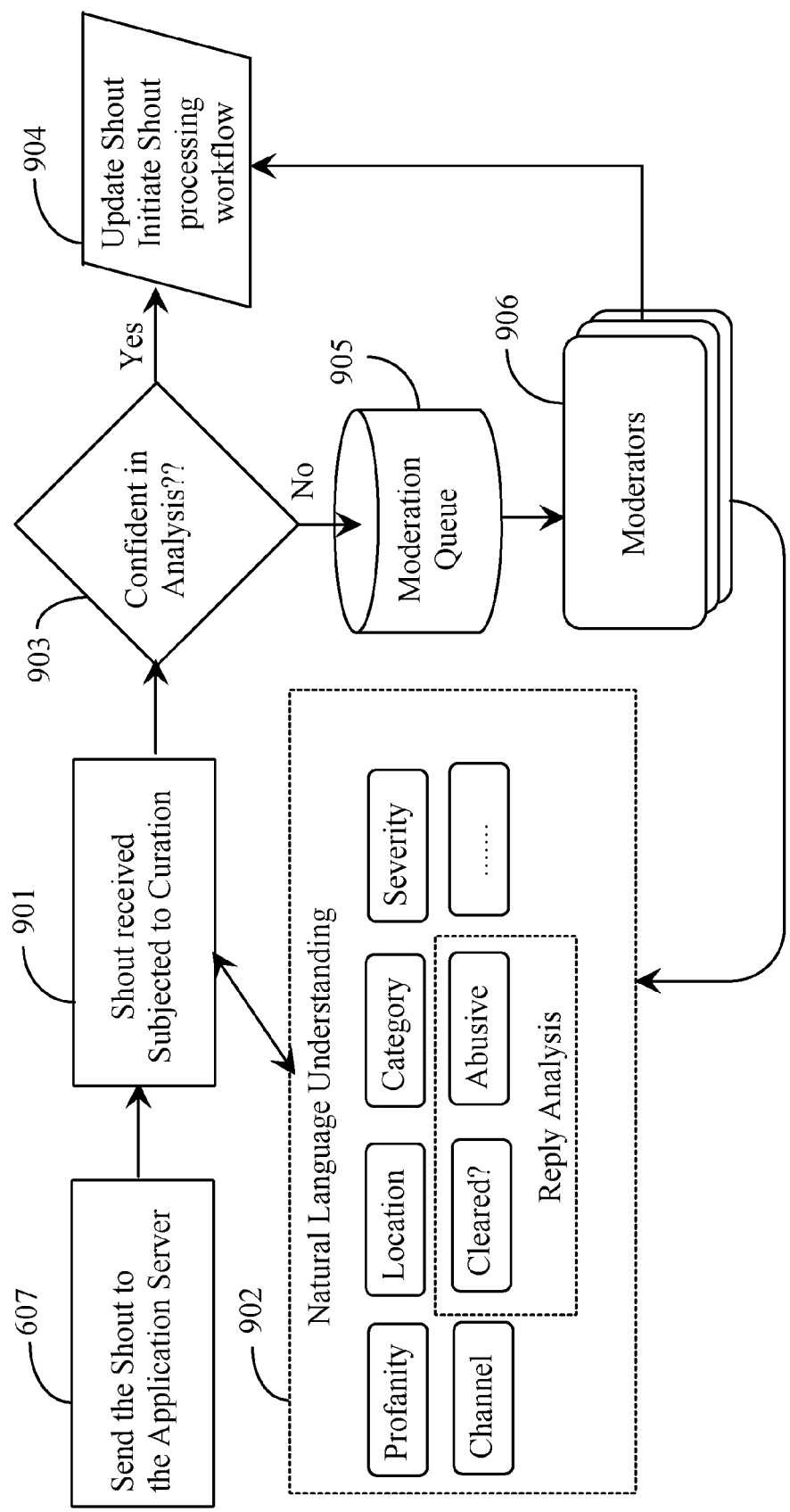
FIG. 9 illustrates a flow diagram depicting action steps at the Server for a Shout received from a user.

Once a user indicates an intent to save the Shout, that Shout is subject to processing. FIG. 9 is a flow diagram depicting action steps at the Server for a Shout received from a user. The flow of FIG. 9 begins with Step 607 from FIG. 6, the point at which a Shout reaches the server. At step 901 the Shout is received at the server. Before being used for any purpose at the server, the Shout must be analyzed in a variety of ways, and tagged in a variety of ways. This process is also termed Curation by the inventors. The Shout received at step 901 is subjected to analytical processing at step 902. This processing includes Natural language processing in which the Shout as an audio stream may be processed through voice recognition, and language in the Shout is parsed to determine, for example, whether profanity is used, in which case the Shout may be deleted. In another embodiment the same Shout may be rendered as text by voice-to-text processing, and textual analysis may be used to determine words and phrases as profanity, for example. Parsing may also help determine a location, which may also be aided by GPS information received from the device in use that transmitted the Shout.

In embodiments of the invention subject matter may be classified by Channels. Natural language processing may be used to determine a Channel for a Shout. A channel may be created and organized around specific subject matter and may be associated with intelligence to determine if a Shout being processed belongs on a particular channel. A basic channel category or subject may be, for example, local traffic conditions. Local traffic conditions may include traffic congestion information, road work information, road closure information, car-pool information, total estimated commute times, and so forth. Other channels may be organized around different categories or subjects, like a channel for Amber Alert communications. Another channel might be dedicated to informing travelers of good deals available in the corridor in which they are traveling. In one embodiment a channel might be available for reporting speed traps and temporary check-points. It may be seen that Channel definition is robust and may be continually evolving in the system.

Processing of a received Shout may also determine a category, which may be a subset of a Channel, and may also determine a priority for a Shout. Priority may be determined, for example, for a traffic Channel, in a traffic hazard category, by the description of a hazard, which may be minor as described, or as determined by the description in the Shout, or may be severe. Highly prioritized Shouts in various embodiments are advanced in time for use, such as forwarding to emergency responders and law enforcement.

When and if a Shout in processing is determined to be appropriate relative to profanity and the like, determinations of location, Channel, category, and severity may be tagged to the Shout for further processing, which may determine life and use of the processed Shout.

Once an incoming Shout is analyzed at step 902, the processed and tagged Shout is subject to a determination of confidence. At various steps in the processing at step 902, a level of confidence may be assigned. For example, processing may determine a Channel with 100% confidence, or a lesser level of confidence. A confidence is determined for each aspect, and at step 903 if any confidence is below the threshold, the Shout may be added to a moderation queue at step 905. If the Shout is determined to have a confidence at or above the set threshold for each aspect, the Shout is moved to step 904, which is a beginning of a Shout processing workflow for use of the tested and confident Shout.

If a Shout moved to step 905 it is queued for further analysis by human knowledge workers termed moderators, as shown in step 906. The knowledge workers resolve any unresolved issues in the queued Shouts, and either send them on to step 904 after the issues are resolved, or delete them from the system. Another responsibility of the knowledge workers is to further train the automatic systems at step 902, with knowledge from the resolution of issues, and amendment of the coded instructions in the automatic process.

Playing Shouts to Users

In the description of processing for Shouts received at the server relative to FIG. 9 above, there is substantial intelligence in the system for determining to which users to send Shouts, which Shouts might be sent in other Channels rather than to users, such as to emergency services and the like, and how Shouts may be associated with other Shouts and may be archived for future use. Leaving details of these further system activities at the server for further enabling description below, the next few figures and description of those figures are for describing how Shouts may be played and viewed at the user's mobile device executing application 113.

Figure 10:
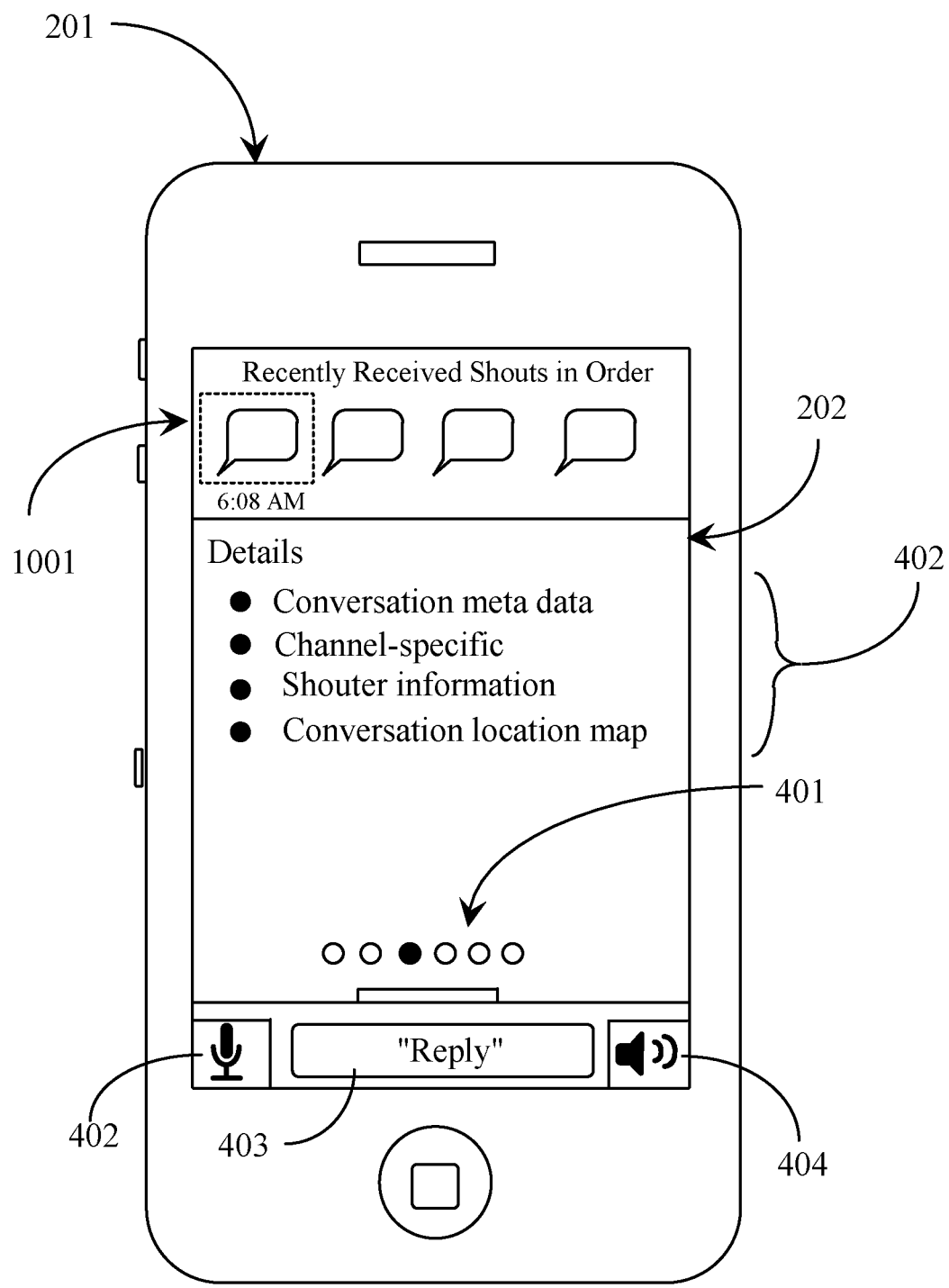
FIG. 10 illustrates an interactive interface for playing Shouts received in an embodiment of the invention.

Arguably the most important use of Shouts from users is transmitting those Shouts, once reviewed and processed, to other users to whom the Shouts may be useful. FIG. 10 illustrates a Shout playing page, displayed while a Shout is being played to a user. When a Shout is received from the system a specific tone is played by the mobile device through the device speaker, or may be played by the vehicle's audio system. This is a tone known to the user, and the Shout may be played following the tone. If the system is in another mode, incoming Shouts are placed in a queue 1001 in order of receipt. When the user prompts the earliest Shout to play, the system will play the Shout through the device speaker or the vehicle's audio system.

A likely next command will be to reply to the Shout, which the user may enunciate, putting the system into listening mode for a reply to be enunciated by the user. A reply to a Shout will be sent in the same way as a newly-created Shout, will be tagged according to the Shout to which the user initiated the reply, and will be analyzed just the same as an original Shout. The system treats associations among Shouts as Conversations, and tags Shouts that become a part of a Conversation according to the Conversation. A user may call up Conversations and review Shouts in Conversations, and this is described additionally below with reference to Content Pages.

Referring again to FIG. 10, as Shouts come in and are queued, the user may command to play until no more Shouts are shown in queue 1001. An active Shout, that is, the Shout being played, is shown with a dotted border in this example, but may be marked or highlighted differently in different embodiments, such as by color coding or animation. Details concerning the active Shout may be shown in the page portion, such as Channel, Conversation data, including perhaps a location map, and information about the person who created the Shout currently active. In some cases, incoming and queued Shouts may be from multiple channels, and the system may organize queue 1001 to play all Shouts from one channel before switching to Shouts from another channel.

There are a number of Audio cues programmed into the system, of which the "Shout Received" cue mentioned above is just one. In other circumstances the system may play an Initiate Command audio cue before the microphone is activated to listen for a voice command. The later activation of the microphone prevents the cue interfering with voice recognition. A tone may be played as a Finalize Command signal, to indicate an Abort, to indicate that a command was not recognized, as a separator between a string of comments or commands, and so on. The audio cues are tones the system makes in interaction with the user to guide the user in voice management of the system. In some cases a voice announcement may be made with or instead of the cue tone, such as, for example, "A Shout has been received".

User Profile

Figure 11:
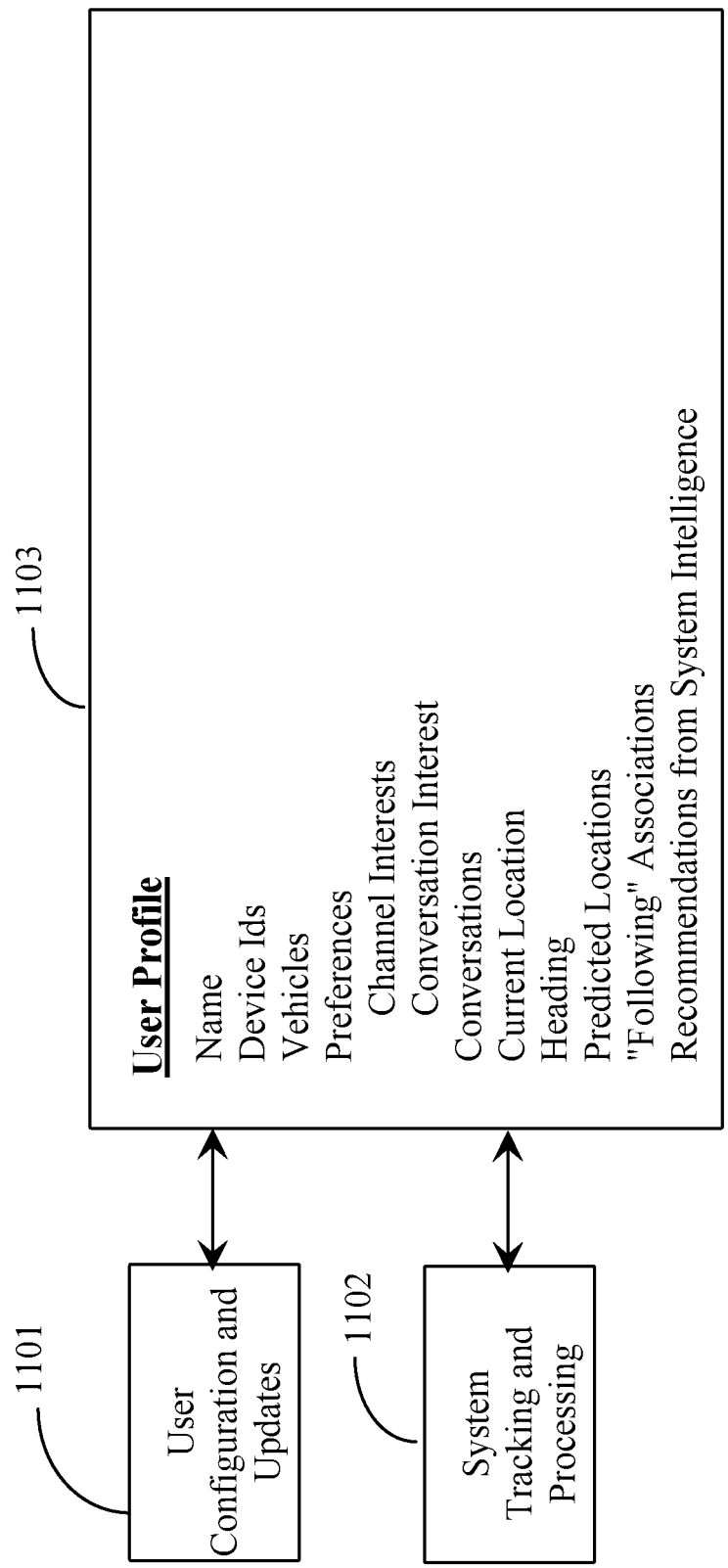
FIG. 11 is a depiction of a user profile in an embodiment of the invention.

An important issue in the system of the invention is at least periodically updated information regarding each user. FIG. 11 illustrates an exemplary user profile in the system, meant to illustrate the different sorts of information about users that the system keeps current and uses in continuing operations to receive and process Shouts and to send the received Shouts to other users. The illustration and description of a user's profile here is not limiting, and in some alternative embodiments of the invention other sorts of information may be tracked and kept than that shown and described with reference to FIG. 11.

In FIG. 11 a user profile 1103 is shown listing types of information kept for each user, and updated frequently. Some of the information listed may be entered by a user as illustrated by activity 1101. This may be done in the registration process described above, and various interactive interfaces may be presented to the user to enter and edit information in that user's profile. In some cases the information and edits may be requested by the system, and in other instances the user may elect to edit and update the profile.

In many instances updates to the profile may be made entirely by system intelligence, such as tracking a user's current location, for example. This system process is illustrated at 1102.

Typical sorts of information in a user's profile include the user's name. Device ids for devices the user may use in practice of the invention may be recorded in the profile, including telephone number and IP Address. Further device information may include manufacturer and model, which may be needed for software compatibility and updates to device application software. Vehicles used by the user in practice of the invention may be listed with pertinent information, such as on-board diagnostics (OBD) identification.

In registration and in later editing and tracking a user's preferences may be developed and recorded for use by the system. Many preferences may be directly entered by the user, and some may be determined by the system by tracking user behavior. Such preferences might include which channels the user is interested in, and conversation interests of the user. As a user is tracked and conversations are developed and recorded in receiving, processing and sending Shouts, the user's participation, and therefore interest, in conversations is recorded in the user's profile.

During use direct tracking of the user's location is accomplished, and that location is kept current in the profile. The user's heading is kept current as well. Locations may be predicted based on prior location, heading, and determined velocity, as well as by other means.

In one embodiment a user is enabled to elect to Follow one or more other users, and these Following associations are recorded and updated in user profiles. A similar "friends" association may be enabled in some embodiments of the invention. And in some cases recommendations from system intelligence may be made and added to a user's profile. As mentioned above, these items of information and data are exemplary and not meant to be limiting to the sorts of information that might be kept current in user's profiles. In a broad sense the user's profile may be considered to include all information and data pertinent to a particular user, including currently tracked and rapidly changing information.

Determining Shout Direction at the Server

Referring again to FIG. 9, step 904 indicates a point where a Shout has been determined to be allowed into the system, analysis is confident, and the Shout has been analyzed and tagged according to channel, category, location, and priority, and perhaps in other ways as well. Channel assignment is critical, as the use of the Shout, that is, to whom and with what priority his Shout may be sent, is a subject of rule sets and pre-programmed instructions associated with each Channel. In a traffic channel, for example, in a hazard category, determination of to whom to send the Shout may be made based on severity and location, and destinations will be determined based on current locations of other users in the system, such as users who are mobile and may be traveling in a corridor which might be affected by the hazard. Shouts may also be sent to emergency responders or to law enforcement based on severity as well. In some cases, a user or an affiliate may have configured the system to get all Shouts of a certain category. This rich set of preprogrammed and configured conditions and rules determines where Shouts are sent. In addition to the distribution back to users and affiliates of received Shouts, all Shouts that pass the analysis are recorded in repository 108 for statistical and other uses.

Figure 12:
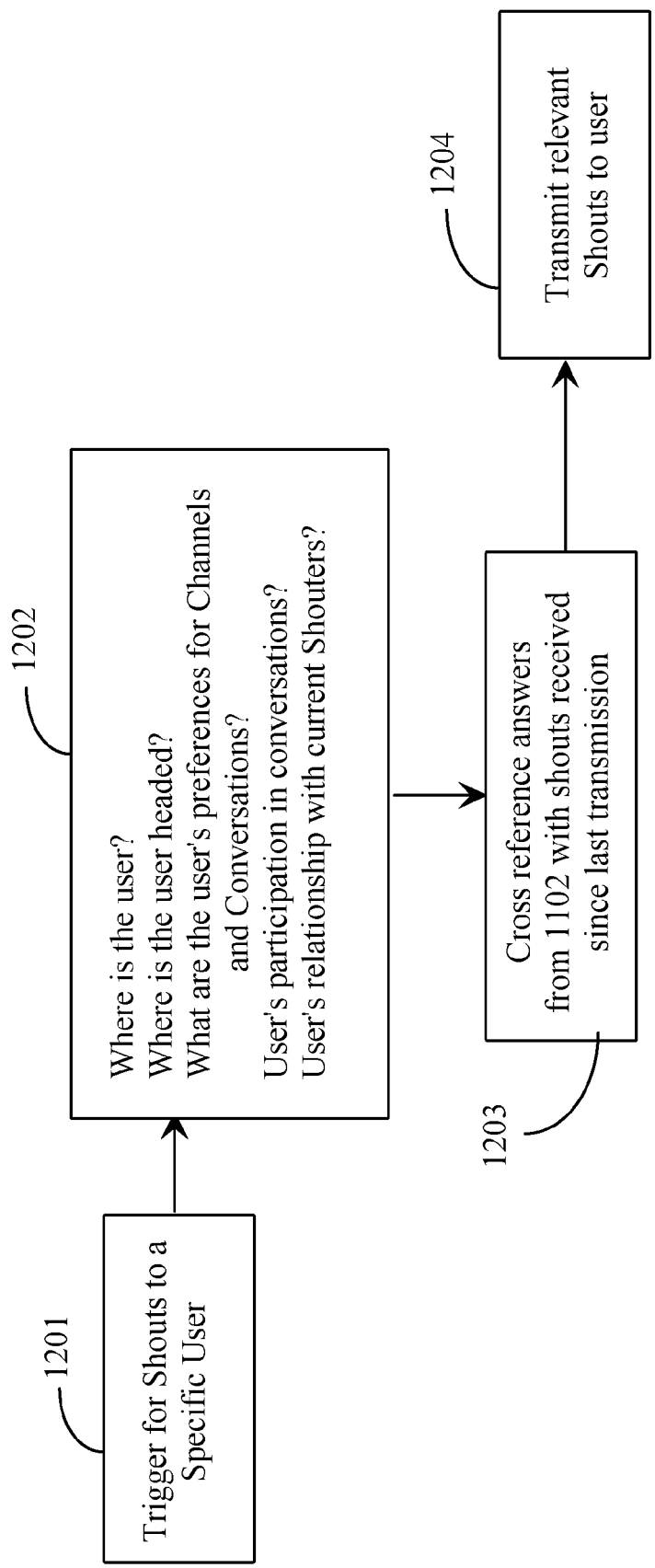
FIG. 12 is a flow diagram illustrating how Shouts are handled at the server for distribution to users.

FIG. 12 is a flow diagram illustrating how Shouts are handled at the server for distribution to users. A trigger event 1201 in most embodiments is necessary for Shouts to be sent to a user. The trigger in many instances may be from the user, specifically requesting Shouts. In some embodiments there may be a periodic trigger. That is, a user may configure the system to notice when that user is on-line and active, and to send relevant Shouts every five minutes, for example. In some case the system may deem a particular Shout to be important enough for a user or several users, to immediately push that Shout to selected users. In another example a trigger may be by a prediction of where a user happens to be based on that user's last known location and the user's current destination Once a trigger is initiated at 1201 the system will access at 1202 all needed information to determine which Shouts received since Shouts were last sent to that user, should be sent now to that user. Much information may be drawn from the user profile depicted and described above with reference to FIG. 11. The system needs to determine where is the user? Where is the user headed? What are the user's preferences for Channels and conversations? What has been the user's participation in conversations with which current Shouts are associated? And what is the user's relationship with each Shouter associated with current Shouts to be distributed?

At step 1203 the system cross references answers from the determinations in 1202 with all current Shouts, and determines which are relevant to the particular user. At 1204 the relevant Shouts are transmitted to the user, and the user may select and play these Shouts through the local device associated with the user.

In some embodiments of the invention there may be specific rules for Shouts enforced, such as a time limit for a Shout. Such limits may differ, for example, over different Channels. In a Traffic Channel, for example, Shouts may be limited to 15 seconds, and specific alert tones may be used in enforcement of such limitations.

The skilled person will understand that the embodiments described above are exemplary, and that there may be many variations and applications not specifically illustrated and described that still fall within the meaning of the invention. For example, much reference has been made in the descriptions above to location and traffic examples, such as road hazards and accident conditions. The invention is, however, certainly not limited to such application, and may be used as well, for example, by persons walking as pedestrians in an urban environment, wherein specific users may make Shouts having to do with congestion, local activity, interesting sights, and the like, and such Shouts may be processed in much the same manner as Shouts in a Traffic Channel as described above, and transmitted back to other users. A similar system may be incorporated as an Enterprise solution, wherein users may be employees or associates of a particular enterprise, and a Shout application may function between employees and associates based on business activities. There are many such use cases that may be proposed with activity much as described in examples above.

The invention claimed is:

1. An information gathering and sharing system, comprising:
   a server connected to a network, the server having a processor and a coupled data repository, with software executing on the processor from a non-transitory medium providing system intelligence; and
   a plurality of computerized communication devices coupled to the network, each having a microphone, a speaker, a GPS capability reporting geographic location, and a display screen, each computerized communication device executing an instance of the software providing local intelligence at least presenting interactive interfaces to users of the devices, the users enabled to record an audio or audio-video input to the server;
   wherein the server receives at least audio from a first one of the computerized communication devices, the audio processed by the software determining if the audio is a command for service or a report of an event occurring at or near a specific geographic location, and if a report determines second ones of the computerized communication devices reporting geographic location within a predetermined distance from the specific geographic location, and messages users of the second ones of the computerized communication devices via the interactive interfaces, sharing the received report, eliciting input regarding the event, and including any information received from users of second ones of the computerized devices regarding the same event, and wherein the reports are further processed along with the elicited input using natural language machine intelligence to determine a communication channel of common subject according to pre-programmed channel definitions, and the reports are tagged accordingly.

2. The information gathering and sharing system of claim 1 wherein the report received is a report from a first one of the computerized communication devices reporting an event occurring in the immediate observable proximity of the first one of the computerized communication devices and the messages are specifically sent to the second ones of the computerized communication devices determined to be approaching the immediate observable proximity.

3. The information gathering and sharing system of claim 1 wherein the input provided by the first ones of the computerized communication devices is recorded in the data repository, and is processed by a natural language machine intelligence to create a summary of the event first reported.

4. The information gathering and sharing system of claim 3 wherein the summaries are transmitted to subscribing enterprises.

5. The information gathering and sharing system of claim 1 wherein a profile is maintained for each user of the system, the profile is updated periodically recording user ID, device ID associated with the user, user preferences, and user selected associations with other users, and wherein reports received by the system are periodically transmitted to other users by cross-referencing report characteristics and content with user location, location-based information and user preferences.

6. A method receiving and sharing information, comprising:
   (a) receiving, at a server connected to a network, the server having a processor and a coupled data repository, with software executing on the processor from a non-transitory medium providing system intelligence, an instance of at least recorded audio from one of a plurality of mobile computerized communication devices coupled to the network, each having a microphone, a speaker, a GPS capability reporting geographic location, and a display screen, each computerized communication device executing an instance of the software;
   (b) processing the audio by the software determining if the audio is a command for service or a report of an event occurring at or near a specific geographic location;
   (c) providing local intelligence at least presenting interactive interfaces to users of second ones of the plurality of mobile computerized communication devices, the users enabled to record an audio or audio-video input to the server, second ones of the computerized communication devices currently located within a preprogrammed distance from the event occurring at or near the specific location;
   (d) messaging users of the second ones of the computerized communication devices, eliciting input regarding the event reported, and sharing the report, including any information received from users of second ones of the computerized devices regarding the same event; and (e) further processing reports along with the elicited input using natural language machine intelligence to determine a communication channel of common subject according to pre-programmed channel definitions, and tagging the reports accordingly.

7. The method of claim 6 wherein the report received is a report from a first one of the computerized communication devices reporting an event occurring in the immediate observable proximity of the first one of the computerized communication devices and the messages are specifically sent to the second ones of the computerized communication devices determined to be approaching the immediate observable proximity.

8. The information gathering method of claim 1 wherein the input provided by the computerized communication devices is recorded in the data repository, and is processed by a natural language machine intelligence to create a summary of the event first reported.

9. The method of claim 8 wherein the summaries are transmitted to subscribing enterprises.

10. The method of claim 6 wherein a profile is maintained for each user, the profile is updated periodically recording user ID, device ID associated with the user, user preferences, and user selected associations with other users, and wherein reports received by the system are periodically transmitted to other users by cross-referencing report characteristics and content with user location, location-based information and user preferences.

* * * * *